United States Patent [19]

Kohigashi et al.

[11] Patent Number: 4,854,749

[45] Date of Patent: Aug. 8, 1989

[54] BEARING SEALING DEVICE

[75] Inventors: Minoru Kohigashi; Toshihiko Shiraki; Akito Tsujimoto, all of Osaka, Japan

[73] Assignee: Koyo Seiko Co., Ltd., Osaka, Japan

[21] Appl. No.: 310,508

[22] Filed: Feb. 14, 1989

Related U.S. Application Data

[63] Continuation of Ser. No. 936,157, Dec. 1, 1986, abandoned.

[30] Foreign Application Priority Data

Nov. 29, 1985 [JP]   Japan .......................... 60-184665[U]

[51] Int. Cl.$^4$ ............................................. F16C 33/78
[52] U.S. Cl. ..................... 384/482; 384/488; 277/95
[58] Field of Search ............... 384/482, 488, 484, 140; 277/95

[56]    References Cited

U.S. PATENT DOCUMENTS

| | | | |
|---|---|---|---|
| 3,494,681 | 2/1970 | Anderson et al. | 384/482 |
| 3,870,384 | 3/1975 | Ladin | 384/482 |
| 4,505,484 | 3/1985 | Okhuma et al. | 384/482 |
| 4,533,265 | 8/1985 | Woodbridge | 384/484 |
| 4,643,594 | 2/1987 | Neder et al. | 384/488 |

Primary Examiner—Lenard A. Footland
Attorney, Agent, or Firm—Finnegan, Henderson, Farabow, Garrett & Dunner

[57]    ABSTRACT

A bearing seal device for a bearing having inner and outer rings, the inner ring including an outer surface, and rolling elements disposed between the rings, comprises annular seal having an outer periphery fixed at the outer end of the outer ring, and an inner periphery extending towards the inner ring and including a bifurcated lip; and a groove in the outer surface of the inner ring for receiving the bifurcated lip, the groove including a bottom side wall, and inner and outer side walls of substantially the same height for reducing grease leakage from the bearing and reducing resistance of the seal.

8 Claims, 1 Drawing Sheet

BEARING SEALING DEVICE

This application is a continuation of application Ser. No. 936,157, filed Dec. 1, 1986, now abandoned.

BACKGROUND OF THE INVENTION

This invention relates to an idler bearing-sealing device for a timing belt of an automotive engine, etc.

Figure 11:
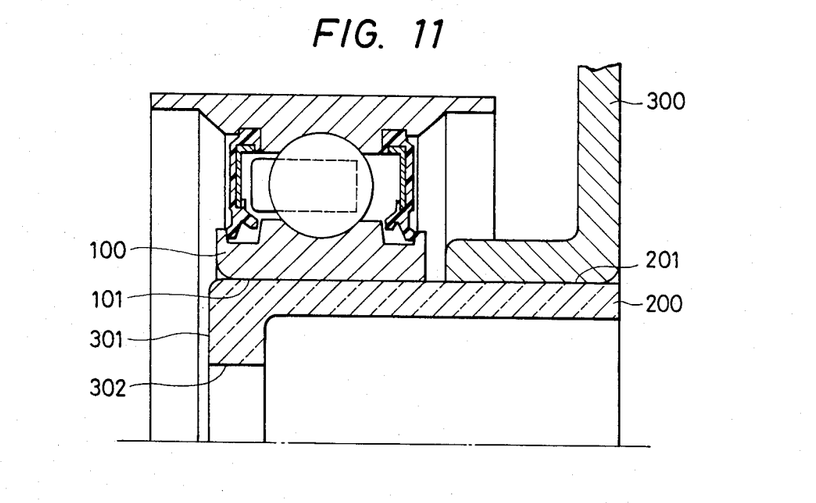
FIGS. 11, 12, 13(a), 13(b), 13(c), and 14 are partial vertical sectional views of various prior art structures.

A conventional idler bearing for the timing belt of an automobile engine such as is shown in FIG. 11, is fabricated by, e.g., press fitting a sleeve 200 to the inner peripheral surface 101 of an inner ring 100, A mounting bracket 300 is press-fitted to the outer peripheral surface 201 of the sleeve 200. One end of the idler bearing is mated with a desired fixed part (not shown) by the bracket 300 and the other end thereof is fixed with a bolt inserting through a position-adjusting slot 302 formed in a blocking wall 301 at one end of the sleeve 200. The idler bearing can provide a belt with proper tension by changing its fitting position along the long position-adjusting slot 302.

Figure 12:
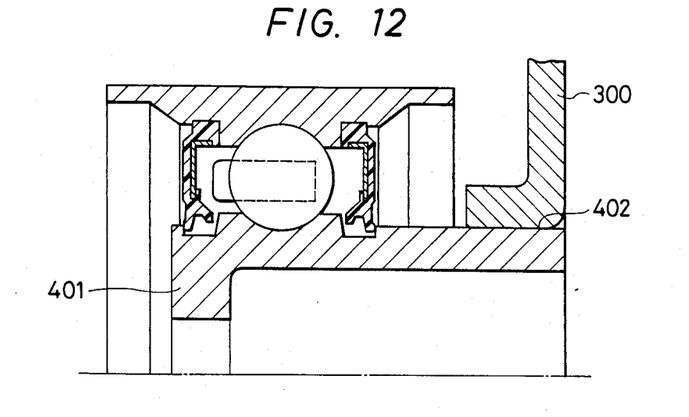

Another idler bearing has recently been developed which has a sleeve incorporating an inner ring 401, shown in FIG. 12, to reduce the number of component parts, weight and cost.

Figure 13A:
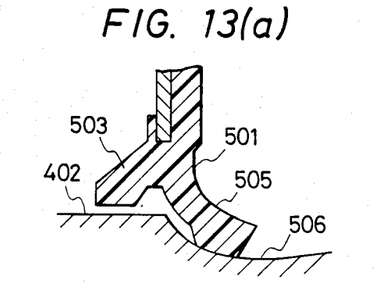
Figure 13B:
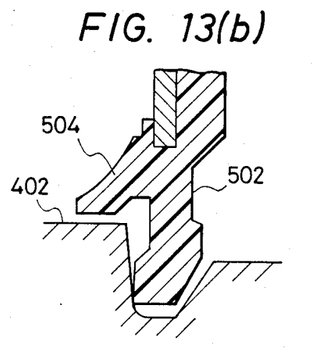
Figure 13C:
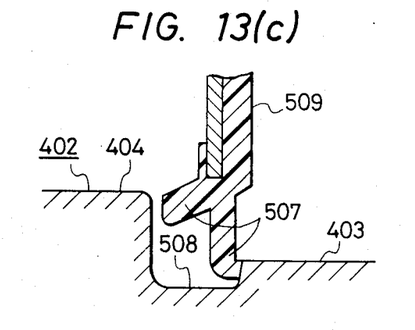

An idler bearing must be sealed tightly when it is installed in an automobile because of oscillation resulting from vibrations, shocks or changes of the belt-feeding rate. For this reason, contact-type bifurcated sealing lips 501, 502 shown in FIGS. 13(a)-(c) are used very often. Grease often leaks out of these lips under vibration, however, because a bifurcated sealing lip such as 501 or 502 is installed with the gap between a lip portion 503 or 504 on the raceway side and the outer peripheral surface 402 of an inner ring. In the case of the lip of the type shown by 501, moreover, a lip extension 505 on the side opposite to the raceway is so arranged as to slidably contact a curved concavity 506. With this arrangement, grease life is shotened because the interference of the lip 505 becomes great, thus causing frictional heat generation. Furthermore, the lip 505 may adhere to the concavity 506 as the pressure in the bearing decreases when it is cooled, and this increases the torque. In the case of lips such as that shown as 507 in FIG. 13(c), the grease leakage is reduced and the intrusion of foreign matter is more effectively prevented in comparison with the lips 501, 502, because the both ends of the lips 507 are contained in a groove 508. However, the lips 501, 502 are superior to the lips 507 in generating a small torque.

When a sealing plate 509 is incorporated as shown in FIG. 13(c), the outer peripheral diameter of a peripheral surface 403 on the side of the groove 508 opposite to the raceway on the outer peripheral surface 402 of the inner ring must be made smaller than the outer peripheral diameter of the peripheral surface 404 on the raceway side to allow the sealing plate 509 to be readily incorporated, and to prevent the bifurcated sealing lip 507 from being damaged. This difference in level on the stepped portion of the outer peripheral surface 402 requires more complex processing by a centerless grinder when the outer peripheral surface 402 of the inner ring is ground. In an idler bearing having such an inner ring configuration, as shown in FIG. 12, the bracket 300 fitted over the inner ring 401 is an unstable manner and may form a weak or inaccurately placed joint. Moreover, the large number of processing steps required increases production costs.

Figure 14:
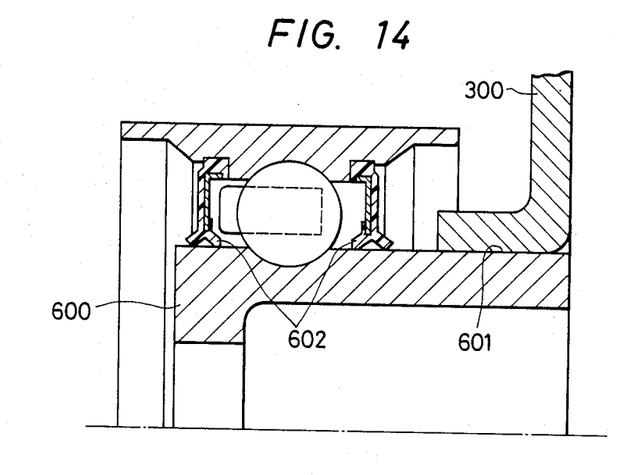

Another bearing, shown in FIG. 14, has been proposed wherein a sealing lip 602 is allowed to directly slidably contact the outer peripheral surface 601 of an inner ring 600 without the need for a groove in the outer peripheral surface 601. This makes processing of the inner ring much easier. However, grease can easily leak out and foreign matter may penetrate into the bearing, because the lip 602 is Y-shaped in cross section, as in the case of seals used for a water pump. As a result, this arrangement is unsuitable for practical use with an idler bearing.

SUMMARY OF THE INVENTION

The present invention is intended to solve the above problems inherent in the prior art and it is therefore an object of the invention to provide seal which effectively prevents grease from leaking out and foreign matter from penetrating into the bearing over long periods of time, and which reduces frictional heat generation.

It is another object of the present invention to provide a bearing-sealing device which is easily constructed and in which a bracket is fitted to the outer peripheral surface of the inner ring to improve bracket-mounting strength and accuracy.

It is still another object of the present invention to provide an inexpensive idler bearing with a sleeve incorporated in its inner ring.

In order to accomplish the objects, the bearing seal device of the present invention is for a bearing having inner and outer rings, the inner ring including an outer peripheral surface, and rolling elements disposed between the rings. In accordance with the invention, the bearing seal device comprises annular sealing means having an outer periphery fixed at the outer end of the outer ring, and an inner periphery extending toward the inner ring including a bifurcated lip; and groove means including a groove in the outer surface of the inner ring for receiving the bifurcated lip, the groove including a bottom wall, and inner and outer walls of substantially the same height for reducing grease leakage from the bearing and reducing resistance of the sealing means.

It is preferred that the bifurcated lip includes an inner lip and an outer lip, the inner lip extending at an angle toward the inner wall of the groove, and the outer lip extending generally radially into the groove. Preferably, the inner and outer lips extend substantially the same distance into the groove, for having a small clearance between each of the lips and the bottom wall of the groove.

It is preferred that the diameter of the sealing means at the inner end of each lip is substantially equal. In addition, the inner lip may be sized for having a small clearance between the inner lip and the inner wall of the groove, and the outer lip may be sized for having a small clearance between the outer lip and the outer wall of the groove.

The outer lip may include an annular projection sized for minimal contact with the outer wall of the groove. At least one of the inner and outer walls of the groove also may be angled with respect to the radial direction of the inner ring.

Preferably, the outer lip includes at least one vent opening for reducing pressure within the bearing.

Since the front ends of the bifurcated sealing lip have the same inner diameter and are contained in the groove, the sealing plate is readily incorporated. The inner lip on the raceway side is capable of leading the grease in the bearing effectively in the radial direction because of its tilted face, whereby the circulation of grease is efficiently carried out. Moreover, the inner lip installed in a state of non-contact with the side wall of the groove nullifies seal resistance. Accordingly, it becomes possible to effectively prevent grease from leaking out and simultaneously prolong grease and seal life by a large margin. Since the outer lip on the opposite-to-raceway side is also caused to slightly contact the side wall of the groove or separate therefrom with the small gap left therebetween, foreign matter is effectively prevented from penetrating into the bearing. The reduced sealing resistance also ensures long seal life.

Furthermore, the groove provided around the outer peripheral cylindrical surface of the inner ring having the same diameter allows the application of through-feed processing to the peripheral cylindrical surface thereof. When the bracket is fitted to the inner ring, the bracket-mounting strength and accuracy are improved and, because the number of processing steps is reducible, an inexpensive idler bearing incorporating a sleeve can be provided.

BRIEF DESCRIPTION OF THE DRAWINGS

The accompanying drawings, which are incorporated herein, and constitute a part of the specification, illustrate serve embodiments of the invention, and, together with the description, several to explain the principles of the invention.

In the drawings:

FIGS. 3(a) and (b) are a vertical sectional view and an arrow diagram of the principal portions provided with air vents at the front ends of outer lips;

DESCRIPTION OF THE PRESENT EMBODIMENT

Reference will now be made in detail to the present preferred embodiment of the invention, examples of which are illustrated in the accompanying drawings.

The bearing seal device of the present invention is for a bearing having inner and outer rings, the inner ring including an outer peripheral surface and rolling elements disposed between the rings. In accordance with the invention, the seal device comprises annular sealing means having an outer periphery fixed at the outer end of the outer ring, and an inner periphery extending toward the inner ring and including a bifurcated lip; and groove means including a groove in the outer surface of the inner ring for receiving the bifurcated lip, the groove including a bottom wall, and inner and outer side walls of substantially the same height for reducing grease leakage from the bearing and reducing resistance of the sealing means.

Figure 1:
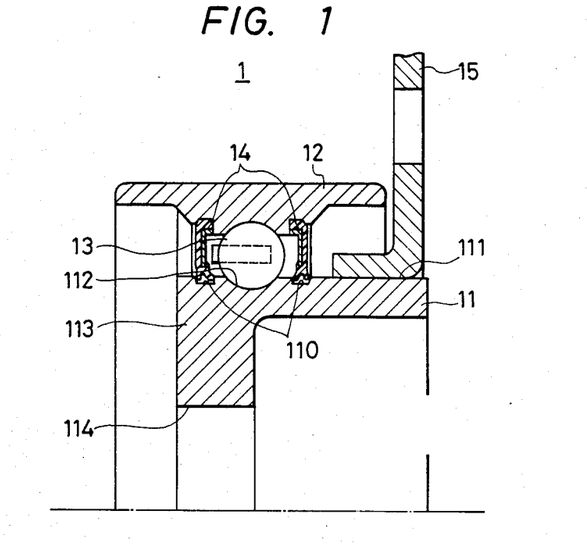
FIG. 1 is a partial vertical sectional view of an idler bearing equipped with a sealing device embodying the present invention.

As embodied herein, an idler bearing 1 shown in FIG. 1 is supplied with the sealing device according to the present invention. The bearing 1 comprises an inner ring 11 having an outer peripheral surface on both sides of a raceway 112, the outer peripheral surface being formed into a cylindrical surface 111 having the same outer diameter, and a groove 110 around the outer peripheral cylindrical surface 111, an outer ring 12 for mating with a timing belt, rolling elements arranged in between the inner and outer rings, and an annular sealing plate 14 with its outer periphery fixed to the outer ring 12 and inner periphery equipped with a bifurcated sealing lip. The outer peripheral cylindrical surface 111 of the inner ring 11 extends in the axial direction with the same outer diameter, or thickness, and the other inside surface 120 incorporates a sleeve portion 113 thereon. A position-adjusting slot 114 is formed in a sleeve portion 113 at one end of the inner ring 11, and a mounting bracket 15 is press-fitted to the outer peripheral cylindrical surface 111 of the axially-directed extension thereof at the other end. The bearing 1 is mated with a desired fixed part (not shown) by the bracket 15 and is fastened to the fixed part with a fixing member (not shown), such as a bolt inserted through the slot 114. A belt is provided with proper tension by selecting an appropriate fastening position along the slot 114.

Figure 2:
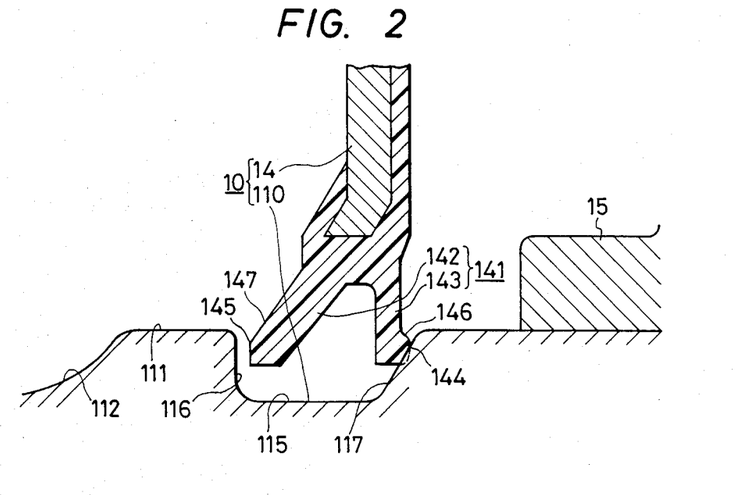
FIG. 2 is an enlarged view of the sealing device of FIG. 1 in accordance with the present invention.

As shown in FIG. 2, the sealing device 10 according to the present invention includes the sealing plate 14 and the groove 110 around the inner ring 11. The sealing plate 14 is properly reinforced by a core metal. The bifurcated sealing lip 141 on the inner periphery of the sealing plate 14 includes an inner lip 142 tilted at a suitable angle toward the raceway side of the inner ring, and an outer lip 143 extended in the roughly radial direction. An axially-directed projection 144 is formed on the side opposite to the raceway on the front end of the outer lip 143. Both the lips 142, 143 are so formed as to extend substantially the same distance into the groove, each front end being arranged close to, but not in contact with the bottom wall 115 of the groove 110. Moreover, the outer peripheral edges 145, 146 of the front end of the inner lip 142 and the projection 144 of the outer lip 143 have a diameter equal to or slightly smaller than that of the outer peripheral cylindrical surface 111 of the inner ring at the groove 110. That is, the distance between the outer edges of the inner and outer lips 22 is equal to or less than the width of the groove opening. The sealing plate 14 is thus readily fitted to the bearing 1. The inner lip 142 is allowed to effectively lead grease remaining close to the inner ring in the bearing 1 in the radial direction (in the direction of the outer ring) because of its tilted face 147 formed on the raceway side. The circulation of grease in the bearing 1 is thus efficiently carried out. Particularly when the bulk grease retained in the bearing 1 moves by vibration, it can be cleaned up effectively. Moreover, the arrangement of inner lip 142 close to, but not in contact with the side wall 116 on the raceway side of the groove 110 serves to nullify sealing resistance and frictional heat generation, thereby prolonging grease life and seal life.

Figures 3A, 3B:
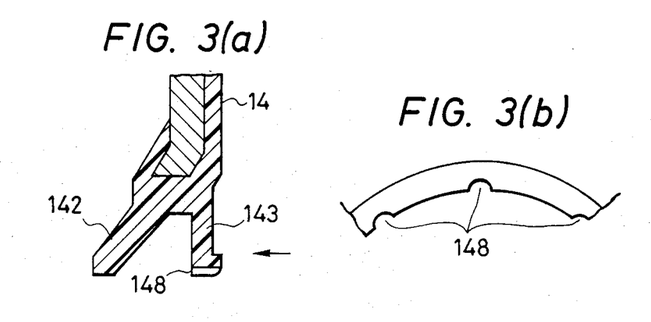

Since the projection 144 at the front end of the outer lip 143 is so arranged as to slightly contact the side wall 117 on the side of the groove 110 opposite to the raceway or separate therefrom with a small gap left therebetween, foreign matter such as dust is effectively prevented from penetrating into the bearing. The minimized sealing resistance also causes less heat generation and keeps the grease and seal life from being adversely affected. Air vents 148 also may be formed at the front end of the outer lip 143 as shown in FIGS. 3(a), (b). Because of the air vents 148, the pressure in the bearing 1 generated when the bearing 1 rotates at high speed is effectively reduced, so that the outer lip 143 is prevented from being forced in to contact with the side wall 117 of the groove. Thus sealing plate 14 is capable of effective sealing for a long period of time.

Figure 4A:
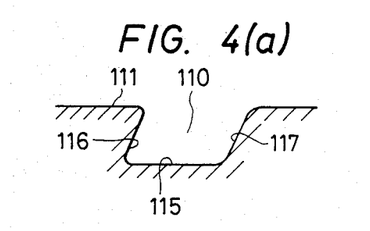
FIGS. 4(a)-(d) are vertical sectional views of the principal portion illustrating the grooves of the sealing device embodying the present invention.
Figure 4B:
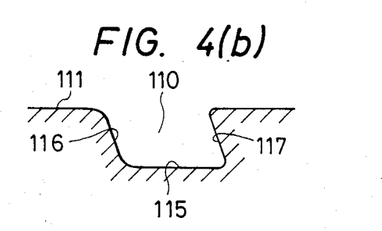
Figure 4C:
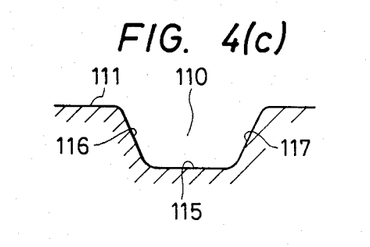
Figure 4D:
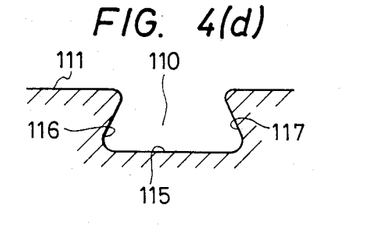
Figure 5:
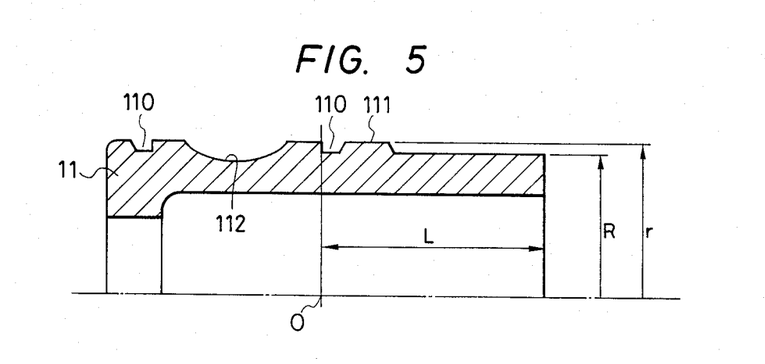
FIG. 5 is a partial vertical sectional view showing a range within which the diameter of the bracket fitting to the outer peripheral cylindrical surface of the inner ring can be made smaller than the outer peripheral cylindrical surface.

The outer peripheral surface 111 of the inner ring 11 is cylindrical and has a uniform diameter excluding the raceway 112 and the groove 110. Particularly, what is different from the conventional device is the equal diameter on both sides of the inner ring relative to the groove 110, whereby the outer peripheral cylindrical surface 111 of the inner ring 11 can be subjected to through-feed processing using a centerless grinder. For this reason, the mounting bracket 15 fits closely to the inner ring 11, thus improving making the fitting strength and accuracy. Moreover, the inner ring incorporating the sleeve with the bracket can be made more cheaply because the number of processing steps is reduced. As shown in FIG. 2, the configuration of the groove 110 may be such that the wall 117 on the side opposite to the raceway 112 is outwardly tilted at a suitable angle relative to the radial direction. Alternatively, both the side walls 116, 117 may be tilted in the same direction as shown in FIGS. 4(a)–(b), or that they may tilted in the directions opposite to each other. As shown in FIG. 5, a diameter R at which the inner ring 11 fits to the bracket may be made smaller than the diameter r of the outer peripheral cylindrical surface 111, provided that the former is set within the range of L without exceeding the center O of gravity in the axial direction of the inner ring 11. In case it exceeds the center O of gravity, a resulting backlash will render the through-feed processing unstable.

Another embodiment of the present invention will subsequently be described.

Figure 6:
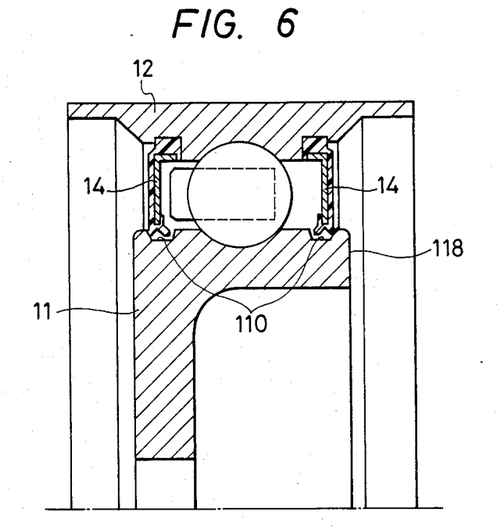
FIGS. 6-10 are partial vertical sectional views of other embodiments of the present invention.
Figure 7:
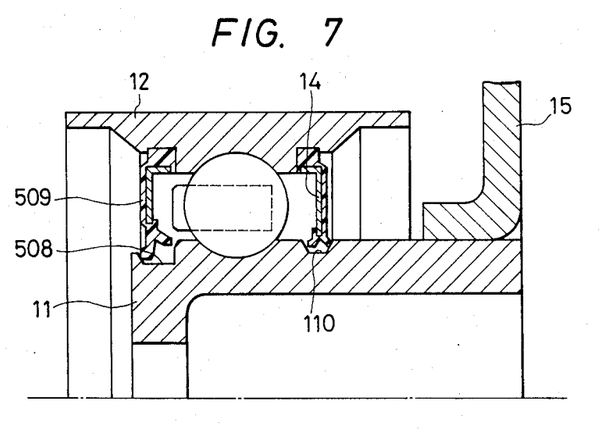
Figure 8:
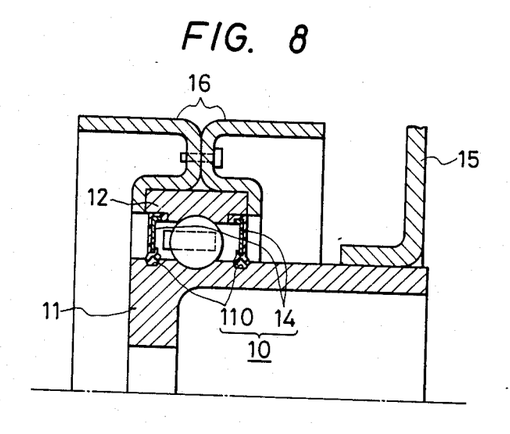

As shown in FIG. 6, the length of the inner ring 11 on the axially-directed open end side 118 from the previous embodiment may be shortened, and the ring 11 then may be without a fitting flange. As shown in FIG. 7, moreover, the sealing-device on the side opposite the bracket in the previous embodiment may be formed as a conventional terraced groove 508 with a sealing plate 509 containing the front end of the lip in the groove 508 as shown in FIG. 13(c). FIG. 8 shows an idler bearing equipped with a sealing device 10 according to the present invention, and an annular flange 16 formed by tightly fastening a pair of cross-sectionally U-shaped members into one body with a bolt and mounting this resulting flange 16 on the outer ring 12.

Figure 9:
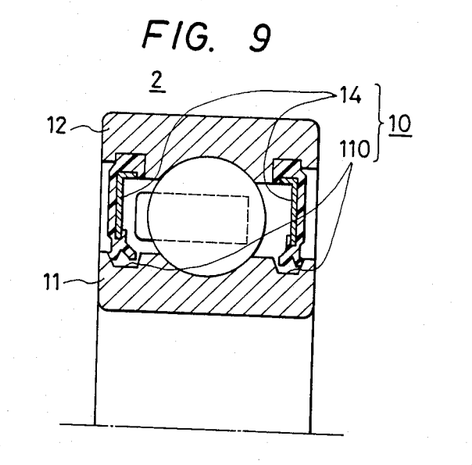
Figure 10:
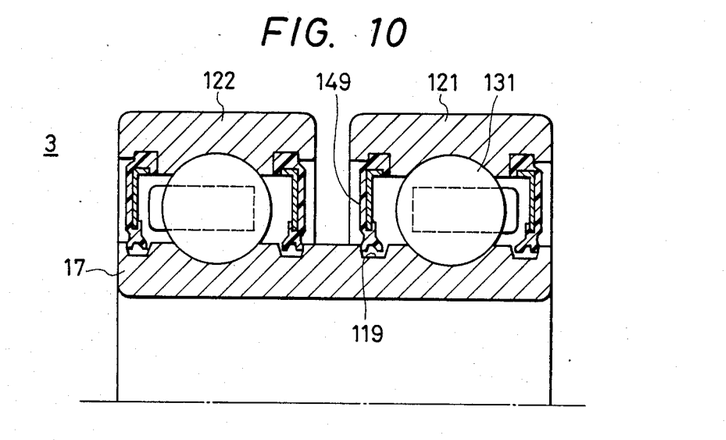

The sealing device 10 according to the present invention is applicable not only to an idler bearing for a timing belt, but also, as shown in FIG. 9, to a standard bearing 2 for general use. As shown in FIG. 10, moreover, it is also usable for a double-row rolling bearing 3 having an inner ring in common. In this case, the side to be secured (e.g., right-hand) is arranged with a sealing plate 149 on the side previously fitted into a groove 119 (left-hand). A rolling element 131 and an outer ring 121 are mounted with the sealing plate 149 using a fitting tool to allow the front ends of the bifurcated sealing lip to remain in the groove 119. A space for receiving the claw of the fitting tool is naturally formed between the two outer rings 121, 122. The above double-row rolling bearing 3 may be used as an outer ring-rotating type bearing allowing two belts to rotate in directions opposite to each other. The sealing device 10 according to the present invention also is adaptable to a multiple-row rolling bearing.

The sealing device thus constructed to the present invention has the following beneficial effects. (1) Since the outer peripheral edge of the inner lip of the bifurcated sealing lip has a diameter equal to or smaller than that of the outer peripheral cylindrical surface of the inner ring, grease in the bearing is effectively led toward the radial direction thereof. Consequently, the circulation of grease is efficiently carried out. Moreover, the inner lip installed out of direct contact with the side wall of the groove nullifies sealing resistance while effectively preventing the grease from leaking out and simultaneously improving seal life by a large margin.

(2) The outer lip allowed to slightly contact the side wall of the groove or separate therefrom with a small gap therebetween effectively prevents foreign matter from penetrating into the bearing, and simultaneously reduces sealing resistance and improves seal life.

(3) The front ends of the bifurcated sealing lip have the same inner diameter mutually and are contained in the groove formed in the outer peripheral cylindrical surface of the inner ring, so that the sealing plate is readily mounted.

(4) Since the groove is formed around the outer peripheral cylindrical surface of the inner ring having the same outer diameter, the outer peripheral cylindrical surface stably can be subjected to through-feed processing. As a consequence, a bracket may be fitted to the inner ring with improved strength and accuracy.

(5) The number of processing steps is reduced, so that an idler bearing incorporating a sleeve can be manufactured inexpensively. Various other modifications could be made in the invention without departing from the scope or spirit of the invention.

What is claimed is:

1. A bearing seal device for a bearing having inner and outer rings, including inner and outer surfaces respectively separated by a space and rolling elements disposed in said space, comprising:

annular sealing means disposed around the rolling elements having first and second ends, said first end of said annular sealing means affixed to the inner surface of said outer ring, said second end of said annular sealing means formed as a bifurcated lip and extending toward the inner ring, said bifurcated lip including an inner lip facing said rolling elements, and an outer lip facing away from said rolling elements, each of said inner and outer lips having inner and outer edges and wherein said bifurcated lip includes an expansion portion from where said inner and outer lips extend downwardly toward the outer surface of the inner ring to the inner surface of the inner ring representing the height of said outer sidewall, the outer surface of the inner ring having a groove for receiving said bifurcated lip, said groove including a bottom wall, inner and outer side walls, the distance between the top edges of said inner and outer side walls defining a groove opening width, said outer edge of said inner lip being disposed in substantially opposing relationship with said inner side wall and said outer edge of said outer lip is disposed in substantially opposing relationship with said outer side wall, the distance between said outer edges of said inner and outer lips being at most equal to said groove opening width and wherein a first diameter, measured from the outer surface to the inner surface of the inner ring, represents the height of said inner side wall extending in said space and a second diameter, measured from the outer surface to the inner surface of the inner ring, represent the height of said outer side wall and said first and second diameters being substantially equal;

said inner and outer lips extending substantially the same distance into said groove to maintain a small clearance between said inner and outer lips and said bottom wall of said groove and, a third diameter, measured from the bottom of said expansion portion to the outer surface of the inner ring, said third diameter being at least equal to said first and second diameters.

2. The device of claim 1, wherein said inner lip extends at an angle toward said inner wall of said groove, and said outer lip extends generally radially into said groove.

3. The device of claim 2, wherein the inner lip is sized for having a small clearance between said inner lip and said inner side wall of said groove and said outer edge said inner lip forms a substantially vertical flat surface located opposite a portion of said inner side wall having a substantially vertical surface.

4. The device of claim 3, wherein said outer lip is sized for having a small clearance between said outer lip and said outer sidewall of said groove.

5. The device of claim 3, wherein said outer lip includes an annular projection sized for minimal contact with said outer side wall of said groove.

6. The device of claim 1, wherein the bearing is an idler bearing, and said inner ring includes a sleeve thereon.

7. The device of claim 1, wherein said outer lip includes at least one vent opening for reducing pressure within the bearing.

8. The device of claim 1, wherein at least one of said inner and outer side walls of said groove is angled with respect to the radial dirction of said inner ring.

* * * * *